United States Patent [19]

Kramer

[11] Patent Number: 4,887,934

[45] Date of Patent: Dec. 19, 1989

[54] IMPACT ABSORBING DEVICE

[75] Inventor: James H. Kramer, Akron, Ohio

[73] Assignee: The B. F. Goodrich Company, Akron, Ohio

[21] Appl. No.: 264,669

[22] Filed: Oct. 31, 1988

[51] Int. Cl.$^4$ .......................... E02B 3/22; B63B 59/02; F16F 1/14; F16F 1/36

[52] U.S. Cl. ..................................... 405/213; 405/212; 114/219; 114/220; 267/140; 267/141.1; 267/141.2; 267/153; 267/154

[58] Field of Search .................................. 405/211–214; 114/219, 220; 267/139, 140, 141.1, 141.2, 154, 279–281, 153

[56] References Cited

U.S. PATENT DOCUMENTS

| 3,013,808 | 12/1961 | Willetts. | |
|---|---|---|---|
| 3,706,481 | 12/1972 | Kramer. | |
| 3,757,930 | 9/1973 | Kramer. | |
| 3,795,392 | 3/1974 | Nemec | 267/140 |
| 3,853,084 | 12/1974 | Kedar | 405/215 X |
| 4,494,738 | 1/1985 | Britton et al. | 267/140 |
| 4,497,593 | 2/1985 | Kramer | 405/212 |
| 4,679,517 | 7/1987 | Kramer. | |

Primary Examiner—Randolph A. Reese
Assistant Examiner—John A. Ricci
Attorney, Agent, or Firm—Joseph Januszkiewicz

[57] ABSTRACT

A floating impact absorbing device for use in docking two adjacent vessels wherein at least two laterally spaced supports journal the ends of a pair of shafts for movement in a common plane. Torsion springs are journaled on the shafts and each torsion spring has oppositely extending levers that resist their rotation. Impact pads located on opposite sides of the common plane are connected to adjacent levers to provide a reactive force on vessels acting on such impact pads.

10 Claims, 6 Drawing Sheets

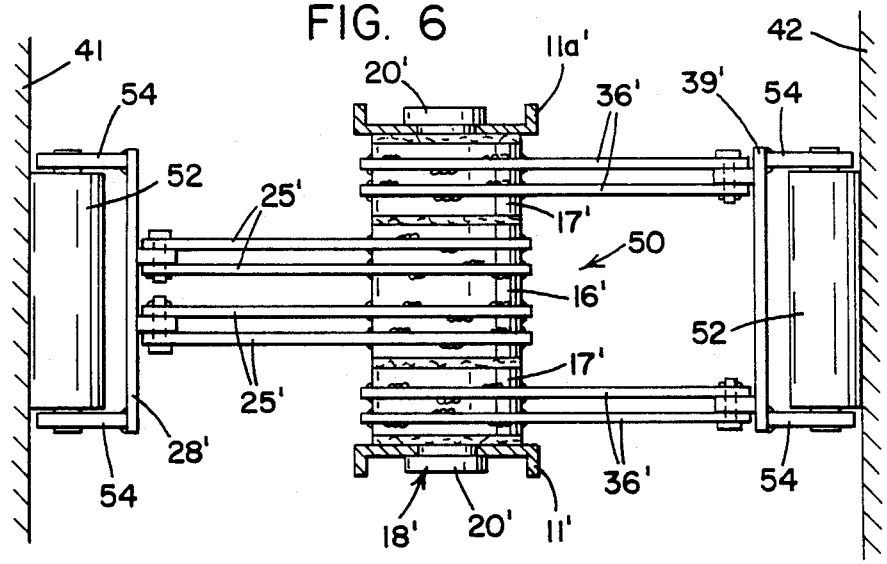
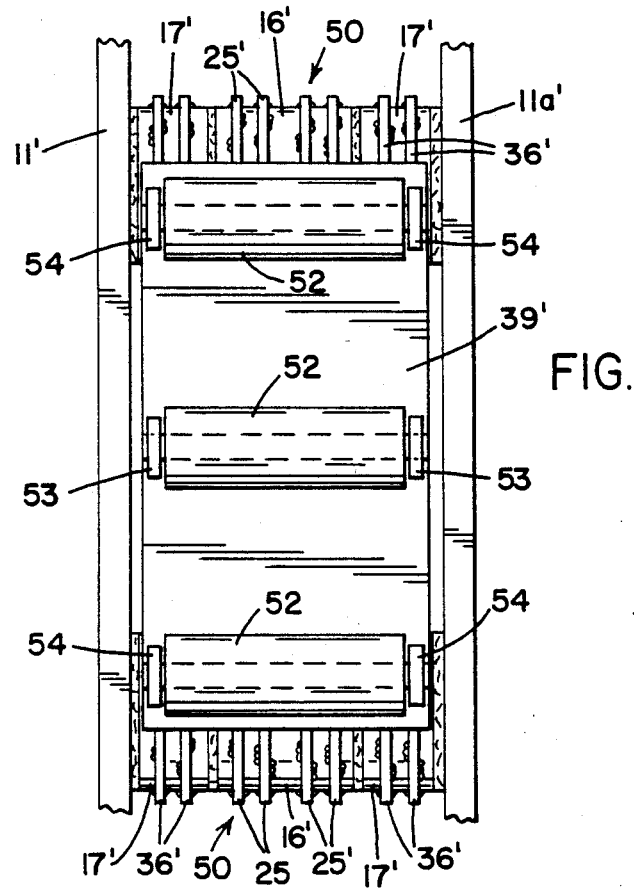

IMPACT ABSORBING DEVICE

This invention relates to an energy absorbing device and more particularly to a fender device or an energy absorbing device that is used in docking situations such as between marine vessels, ship to tender vessels or ship to docks or piers. Such energy absorbing device is applicable to all classes of ships.

Fender devices are used between vessels, work boats, vessels and docks, or between adjacent submarines to prevent damage to such vessels due to the substantial amount of forces or impact that is needed to be absorbed when such adjacent vessels or vessels and docks work at close quarters in rough waters.

The ability to absorb force deflection has been categorized in two main bodies. The first is those that have little deflection before resistance is encountered and then there is a sharp build-up of the reactive forces. The second type of energy absorption device has considerable deflection followed by a very rapid build-up of energy absorption.

The present invention utilizes an energy absorbing system that protects adjacent vessels over a full range of forces in a unique manner whereby the reactive forces as well as the impact forces are absorbed immediately over a large and continuous range. The design features assure the forces are imparted into the energy device per se and not to the supporting structure. In the instant invention the supporting structure is used to align contact between the respective force imparting members be they vessels or vessel and dock. One of the unique features of the present invention is that the energy absorbing device has the ability to react quickly to the reactive forces at an initial high rate and thence to continue to receive further forces at a maximum energy level to assure maximum protection over a full range of forces as contrasted to many systems that peak out early or have slow initial impact absorbing ability and are essentially operative only at a quick peaking impact loading situation.

SUMMARY OF THE INVENTION

The invention is directed to a energy absorbing fender device for use between marine vessels which employs plural torsion means in cooperative action. A pair of support members have pairs of aligned slots to guide a pair of axially-extending rigid shafts. A tubular shaft is journaled on each rigid shaft with three axially spaced annular elastomeric members encompassing them and adhered thereto. Each annular member has an outer shell bonded thereto to define a torsion spring on each rigid shaft. Lever arms are connected to each torsion spring to present oppositely disposed lever arms for each torsion spring such that the lever arms on one side of the central plane that passes through the axes of the rigid shaft are opposed by lever arms on the other side of the central plane. A pair of impact means are pivotally connected to the outermost ends of the lever arms on opposite sides of the plane to provide an energy absorbing device as adjacent vessels collide or encounter such spaced impact means.

DESCRIPTION OF THE DRAWINGS

FIG. 6 is a plan view partly in section of the modified form of the energy absorbinq fender device taken on 7—7 of FIG. 5;

FIG. 7 is a front elevational view of the modified form of energy absorbing device as shown in FIG. 6.

DETAILED DESCRIPTION

Figure 1:
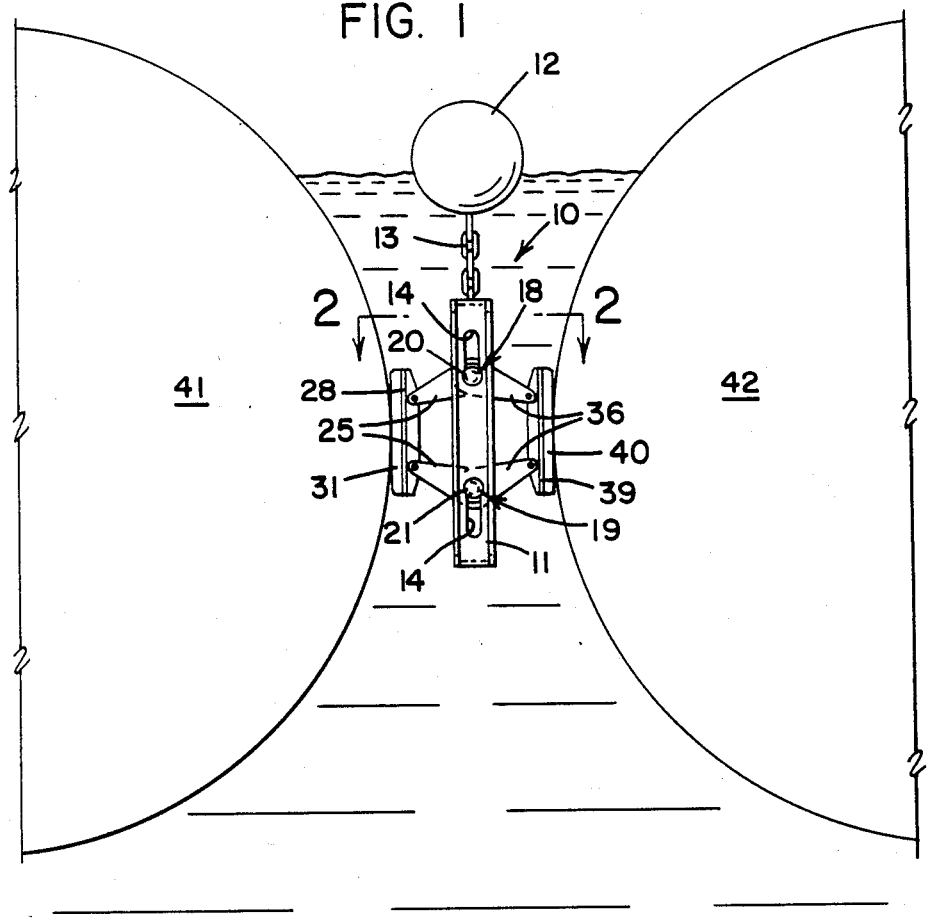
FIG. 1 is a side elevational view of a an energy absorbing fender device operating between a pair of marine vessels.
Figure 2:
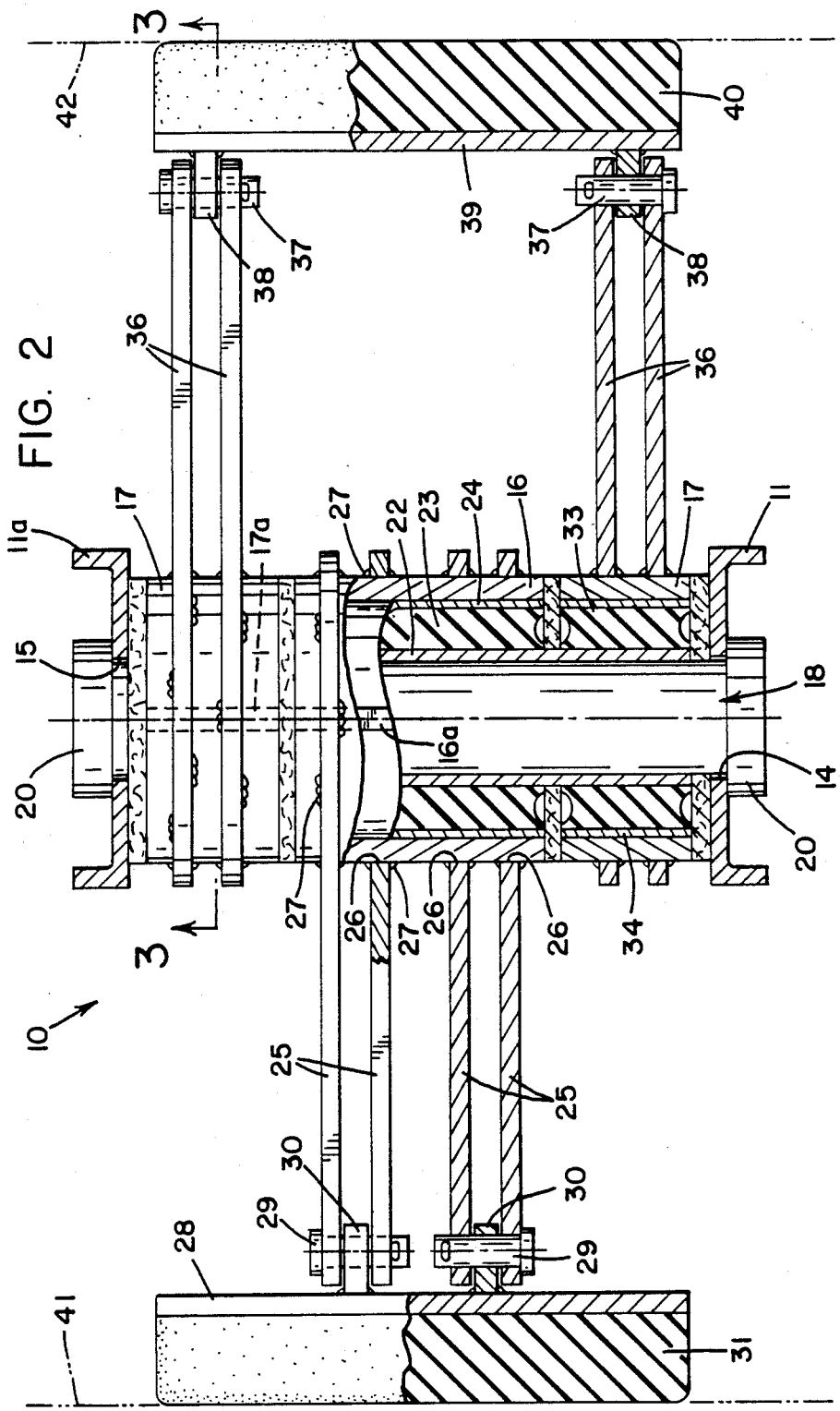
FIG. 2 is an enlarged plan view partly in section of the fender device taken on line 2—2 of FIG. 1.
Figure 3:
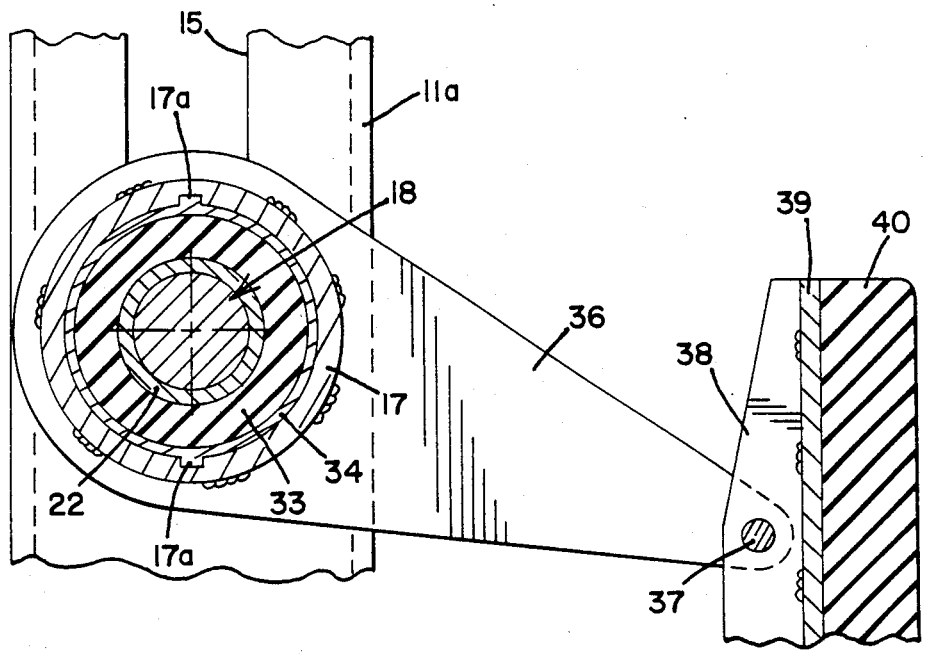
FIG. 3 is a fragmentary side elevational view of one torque arm of the energy absorbing fender device taken on line 3—3 of FIG. 2.

Referring to the drawings wherein like reference numerals designate like or corresponding parts throughout the several views, there is shown in FIGS. 1 and 2 a floating impact absorbing device or fender 10 which includes a pair of depending support members 11 (only one shown in FIG. 1) and 11a attached to a floating sphere 12 via a chain or chains 13 which maintains the impact absorbing device or fender 10 at a given level in the water.

Support member 11 has a pair of vertically spaced guide slots 14 which are in lateral alignment with vertically spaced guide slots 15 in support member 11a.

The pairs of aligned slots 14 and 15 in the support members 11 and 11a receive an upper shaft 18 and a lower shaft 19 with end caps 20 and 21 in their respective end portions to retain such shafts within the guide slots.

Mounted on the respective upper shaft 18 and lower shaft 19 are torsion assemblies similar in design and therefore only one will be described. Shaft 18 has an inner tubular shaft 22 journaled thereon for the full axial length thereof. The axial central portion of inner shaft 22 has an annular rubber spring element 23 mounted thereon with the inner circumferential surface of the annular element 23 bonded as by a suitable adhesive to the outer surface of the shaft 22. The outer circumferential surface of the annular rubber element 23 is bonded as by a suitable rubber-to-metal adhesive to the inner circumferential surface of an outer shell 24 which is concentric with the axial central portion of shaft 22, thus leaving the respective end portions of shaft 22 free and unattached except as described below. The outer shell 24 is mounted in a cylindrical housing 16 as by keyway 16a. If desired, the outer shell 24 and cylindrical housing 16 may be a unitary shell. A plurality of longitudinally extending torque arms or levers 25 with bores 26 on their one ends, suitably encompassing the cylindrical housing 16 and are attached thereto as by welding, indicated as 27. The other ends of levers or torque arms 25 are pivotally connected to rigid backing plates 28 via pivot pins 29 which interconnect projections 30 on backing plate 28 to lever arm 25. Rubber contact pads or cushions 31 are suitably mounted or adhered to the outer surface of the rigid backing plates 28 to provide a resilient contact surface for the impact absorbing device.

The circumferential outer surface of each outer end portion of inner shaft 22 has an annular rubber spring element 33 suitably bonded as by a suitable rubber-to-metal adhesive, which rubber element is then suitably connected by a rubber-to-metal adhesive to the inner circumferential surface of an outer shell 34. Each outer shell 34 is mounted in a cylindrical housing 17 via keyway 17a. If desired, the outer shell 34 and cylindrical housing 17 may be constructed as a unitary shell.

As seen in FIG. 2, the outer shell 24 along with its concentric annular rubber spring element 23 and the cylindrical housing 16 have an axial gap between them and the adjacent outer shells 34 and their concentric annular rubber spring elements 33 and the cylindrical housing 17, which gap is filled with a spacer material to facilitate the torsion action described. Each cylindrical housing 17 is connected to one end of a pair of lever arms or torque arms 36. The other ends of torque arms 36 are connected via pivot pins 37 to projections 38 at opposite ends of rigid backing plate 39. Backing plate 39 has a rubber contact pad or cushion 40 suitably mounted or adhered to the outer surface thereof as in backing plate 28 to provide opposing working pads.

As described the upper shaft 18 supports a torsion spring with opposing arms 25 and 36 connected to backing plates 28 and 39 and their cushions or pads 31 and 40 respectively. The lower shaft 19 is identical thereto and supports a torsion spring with opposing arms connected to backing plates 28 and 39 and their cushions or pads 31 and 40 respectively. Thus, as seen in FIG. 1, the respective pads 31 and 40 are held in position by plural torsion springs and their respective opposing arms.

Figure 4:
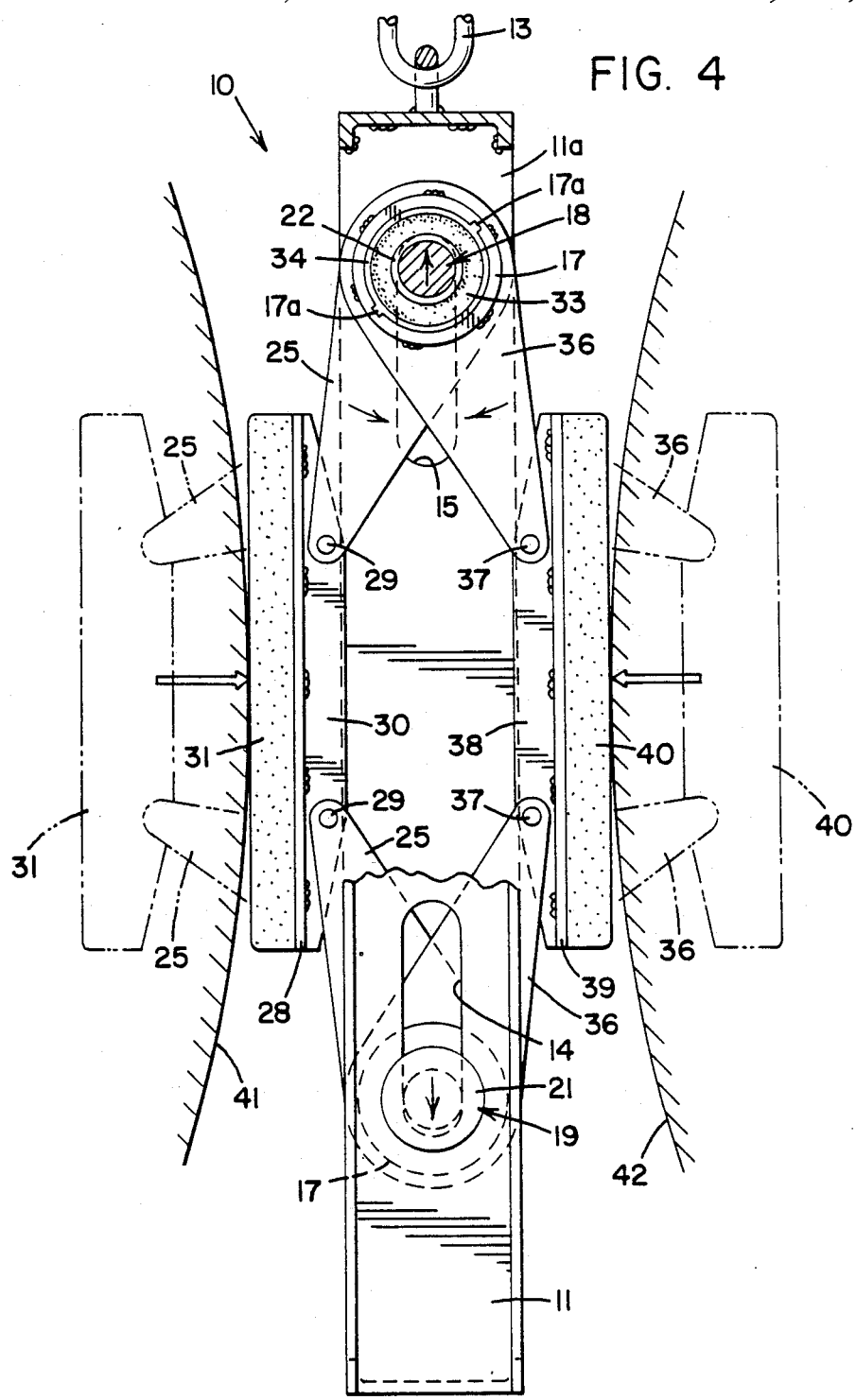
FIG. 4 is a side elevational view of the energy absorbing fender device in its actuated condition deployed between two adjacent marine vessels.

In the operation of the above described floating impact absorbing device, there is shown in FIG. 1, the respective adjacent side portions of a pair of vessels 41 and 42 (submarines or hulls) with the floating impact absorbing device 10 substantially mid-way between such vessels and such vessels 41 and 42 only making light contact with the rubber contact pads 31 and 40 respectively. As the vessels 41 and 42 move toward each other due to fluctuating forces of the waves, swells and currents, the forces from the vessels impart a reactive force on the rubber contact pads 31 and 40 such that the lever arms 25 and 36 pivot about shafts 18 and 19. Arms 25 and 36 connected to upper shaft 18 (FIG. 4) via the annular springs 33 and 23 pivot inwardly toward each other, winding up a reactive force in such springs 33 and 23 while arms 25 and 36 connected to the lower shaft 19 via annular springs 33 and 23 pivot inwardly also toward each other and wind up springs 33 and 23. As this action takes place, the respective shafts 18 and 19 move away from each other within their respective guide grooves 15 and 14 storing up energy which can be the impact energy imparted by the two vessels 41 and 42 moving toward each other.

In this energy absorbing device as seen in FIG. 2, the respective lever arms 25 and 36 operate on different outer shells, namely 24 and 34 respectively. The respective annular rubber torsion springs 23 and 33 are wound up in opposite directions as resisted by the common inner shaft 22 which is bonded to both annular springs 23 and 33. With pads 31 and 40 moving toward each other, the common inner shaft 22 causes the respective shafts 18 and 19 (FIG. 4) to move away from each other as a reaction to the forces exerted on such pads and guided in their movement by the guide slots 14 and 15.

In the initial contact by pads 31 and 40 with the vessels 41 and 42, the reactive force peaks suddenly due to unique placement of the three annular rubber torsion springs 23 and 33, wherein the two annular rubber springs 33 act in concert against the intermediately located annular rubber torsion spring 23. Further movement of pads 31 and 40 toward each other continue to maintain the build-up of the reactive force at the high rate of this peaking thereby absorbing the impact at a high rate with the movement of respective shafts 18 and 19 away from each other which allows this high rate of energy to be absorbed while permitting a sufficient degree of movement of the respective vessels.

Figure 5:
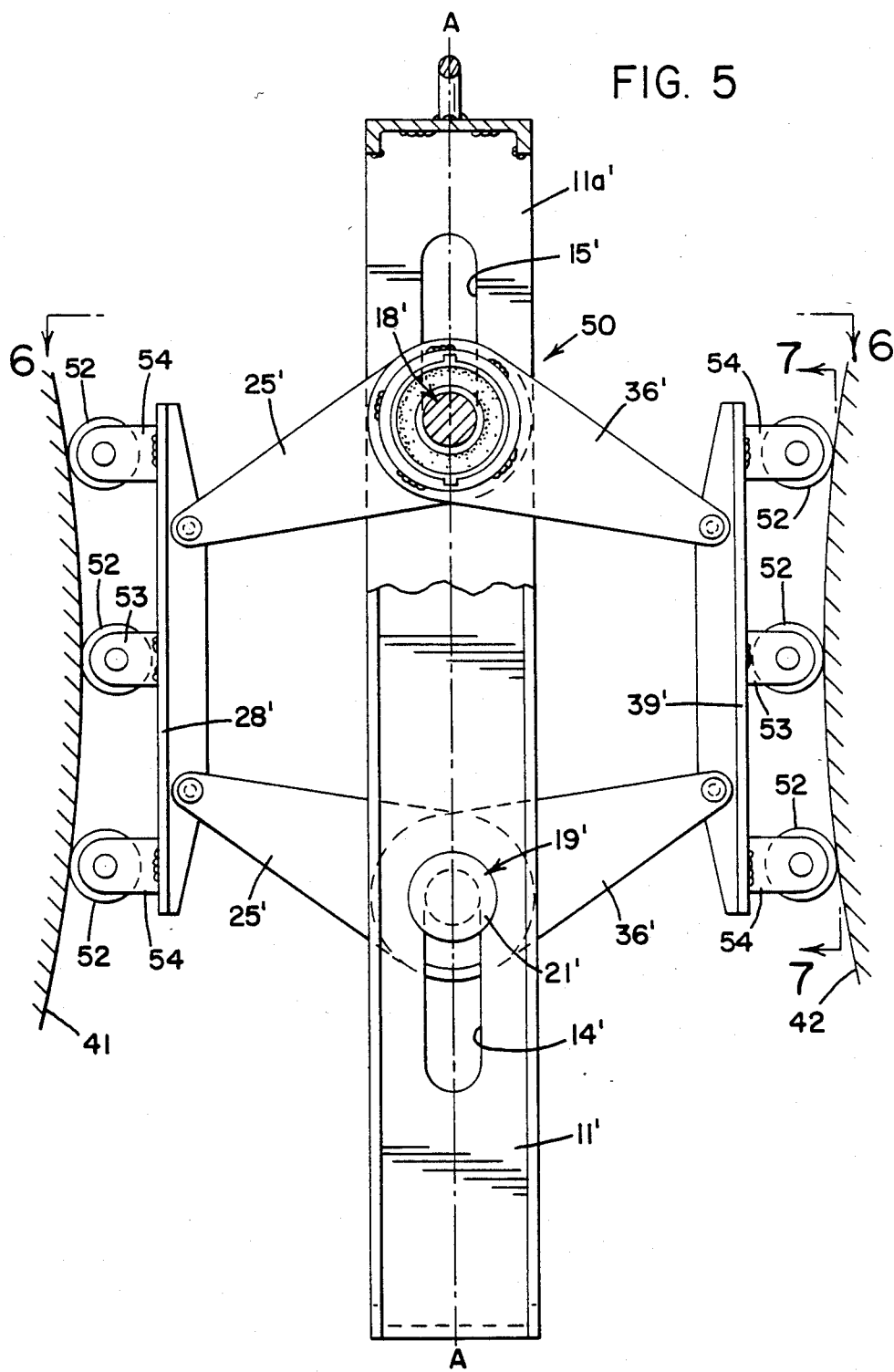
FIG. 5 is a side elevational of a modified form of the energy absorbing fender device in a neutral non actuated condition between two vessels.

A modified construction of the above described floating impact absorbing device is shown in FIGS. 5 through 7 wherein identical elements are given similar reference numerals. Therein the torsion spring element is designated 50 and is identical to that shown in FIG. 2 with the lever arms designated 25' and 36' for the corresponding torque arms or lever arms 25 and 36. In each case these lever arms are connected to rigid backing plates 28' and 39' respectively. To this point, the constructions of the energy absorbing devices are substantially identical. In the modified construction, the difference is that the respective backing plates 28' and 39' have connected to them a plurality of rollers 52 rather than rubber pads 31 and 40. Further the location of the rollers 52 can be staggered in vertical alignment such that the rollers 52 located along the intermediate portion are set back to present and facilitate an arcuate contacting of the vessels 41 and 42. Stated another way the respective uppermost or lowermost rollers 52 lie along parallel vertical planes that are equidistant from a central vertical plane designated A—A in FIG. 5 that contains the axes of upper shaft 18' and lower shaft 19' with the intermediate roller 52 being slightly closer to plane A—A than the outermost rollers 52. This is accomplished by having the bracket 53 on which the intermediate rollers are located shorter in length than the bracket 54 that interconnect the outermost rollers 52 to backing plates 28' and 39'. With the rollers 52 presenting an arcuate configuration, there is a marked propensity to center the energy absorbing device between the two adjacent docking vessels 41 and 42.

It will be apparent that, although a specific embodiment and certain modifications of the invention have been described in detail, the invention is not limited to the specifically illustrated and described constructions since variations may be made without departing from the principles of the invention.

What is claimed is:

1. A floating impact absorbing device for use in docking two adjacent vessels comprising a pair of spaced support means, a pair of torsion spring means mounted on said support means, each of said torsion spring means having oppositely extending lever means, impact pad means located on opposite sides of said support means and connected to adjacent lever means to provide a reactive movement upon contacting the sides of vessels, said lever means pivotally connected to said torsion spring means to store energy therein on pivotal movement of said lever means toward each other as said pads move toward each other, each of said support means has a pair of slots in longitudinal alignment, said longitudinally aligned slots being aligned laterally in pairs to define two pairs of laterally aligned slots, and said pair of torsion spring means guided in said pairs of slots as said lever means move toward each other.

2. A floating impact absorbing device as set forth in claim 1 wherein each torsion spring means is freely journaled on a rigid shaft, and each pair of laterally aligned slots receives the respective ends of said rigid shafts for guided movement in said slots.

3. A floating impact absorbing device as set forth in claim 2, wherein each of said rigid shafts receives a tubular member, each tubular member has three axially spaced annular rubber members encompassing and secured thereto, each annular rubber member has an outer shell secured thereto, the intermediate outer shell of said axially aligned shells is secured to lever means on one side of a plane containing the axes of said rigid shafts while said outer shells are secured to the remaining lever means on the other side of said plane.

4. A floating impact absorbing device as set forth in claim 3 wherein a plurality of rollers are mounted on opposite sides of said plane in lieu of said pads.

5. A floating impact absorbing device as set forth in claim 4 wherein said Plural rollers on each side of said plane lie along an arc wherein the intermediately located rollers relative to the outermost rollers is closest to said plane.

6. A floating impact absorbing device for use in docking two adjacent vessels comprising a pair of spaced support members, each support member having a pair of aligned slots, a pair of spaced rigid shafts having their respective ends journaled in said slots for guided movement therein, a torsion spring mounted on each of said rigid shafts, each torsion spring having an inner tubular shaft journaled on said rigid shaft, a first elastomeric annular member having its inner surface bonded to said tubular shaft, a pair of axially spaced elastomeric annular members mounted on opposite sides of said first elastomeric annular member having their inner surfaces bonded to said tubular shaft, an outer shell encompassing said first elastomeric annular member and bonded thereto to define a first outer shell means, a pair of outer shells encompassing said axially spaced elastomeric annular members and bonded thereto to define second outer shell means, a first set of lever members secured to said first outer shell means, a second set of lever members secured to said second outer shell means, said first set of lever members and said second set of lever members are located on opposite sides of a plane passing through the axes of said rigid shafts, and impact contacting means connected to said first set of lever members and to said second set of lever members to react against each other as adjacent vessels contact said impact contacting means.

7. A floating impact absorbing device as set forth in claim 6 wherein said impact contacting means is a planar elastomeric pad.

8. A floating impact absorbing device as set forth in claim 6 wherein said impact contacting means is backing member with a plurality of rollers thereon to facilitate the contacting of moving vessels therewith.

9. A floating impact absorbing device as set forth in claim 8 wherein said rollers define a concave arcuate shape relative to said plane passing through said axes of said rigid shafts.

10. A floating impact absorbing device for use in docking two adjacent vessels comprising at least a pair of support members including at least a pair of shaft means having their axes in a common plane that is in a direction passing through said support members, said support members having slots to guide said shafts for movement in said common plane, torsion spring means journaled on each of said shaft means, each torsion spring means having a plurality of lever means extending in opposite directions that are generally transverse to said common plane wherein said torsion spring means winds up to resist the movement of said lever means being rotated toward each other about said shafts, all of said lever means lying to one side of said common plane define a first set of levers while all of said lever means lying to the opposite side of said common plane define a second set of levers, and a pair of cushion pads mounted on opposite sides of said common plane and connected to said first set and said second set of levers respectively to provide a yielding of said cushion pads toward each other to absorb impact energy as said torsion springs are wound up by vessels imparting forces to said pads.

* * * * *